United States Patent

[11] 3,597,682

[72] Inventors John C. Hubbs
 Lafayette;
 Thomas E. Castanera, Oakland, both of, Calif.
[21] Appl. No. 774,798
[22] Filed Nov. 12, 1968
[45] Patented Aug. 3, 1971
[73] Assignee E-H Research Laboratories, Inc.
 Oakland, Calif.

[54] PROGRAMMABLE TESTING UNIT FOR SINGLE SHOT TESTING
 3 Claims, 8 Drawing Figs.
[52] U.S. Cl. .................................................. 324/73 AT, 324/158 R
[51] Int. Cl. ........................................................ G01r 15/12
[50] Field of Search ........................................... 324/73, 51, 158

[56] References Cited
 UNITED STATES PATENTS
 3,423,677 1/1969 Alford et al. ................ 324/73

*Primary Examiner*—Gerard R. Strecker
*Attorney*—Flehr, Hohbach, Test, Albritton and Herbert ABSTRACT: A programmable testing system for testing large scale array integrated circuits and similar devices having several inputs and outputs. The device is coupled from an input standpoint to two pulse generators and several DC power supplies and from an output standpoint to a single-shot strobing voltmeter and a single-shot-switching time converter. The pulse generators, DC power supplies, switching time converter, and single-shot strobing voltmeter are programmed by individually coupled and separate program registers preloaded with instructions from a core memory. A system control unit controls the filling or loading of these program registers. The program registers also control a switching matrix to couple the device under test and their terminals to the proper inputs and outputs. The control unit senses when the test sequence is over and when the entire test on the device is completed. This provides for a completely automatic testing sequence. When one testing sequence ends and another is to begin only those program registers whose parameters are changed are reloaded thus saving essential time in the testing procedure and effectively utilizing the single-shot capability of the testing instruments.

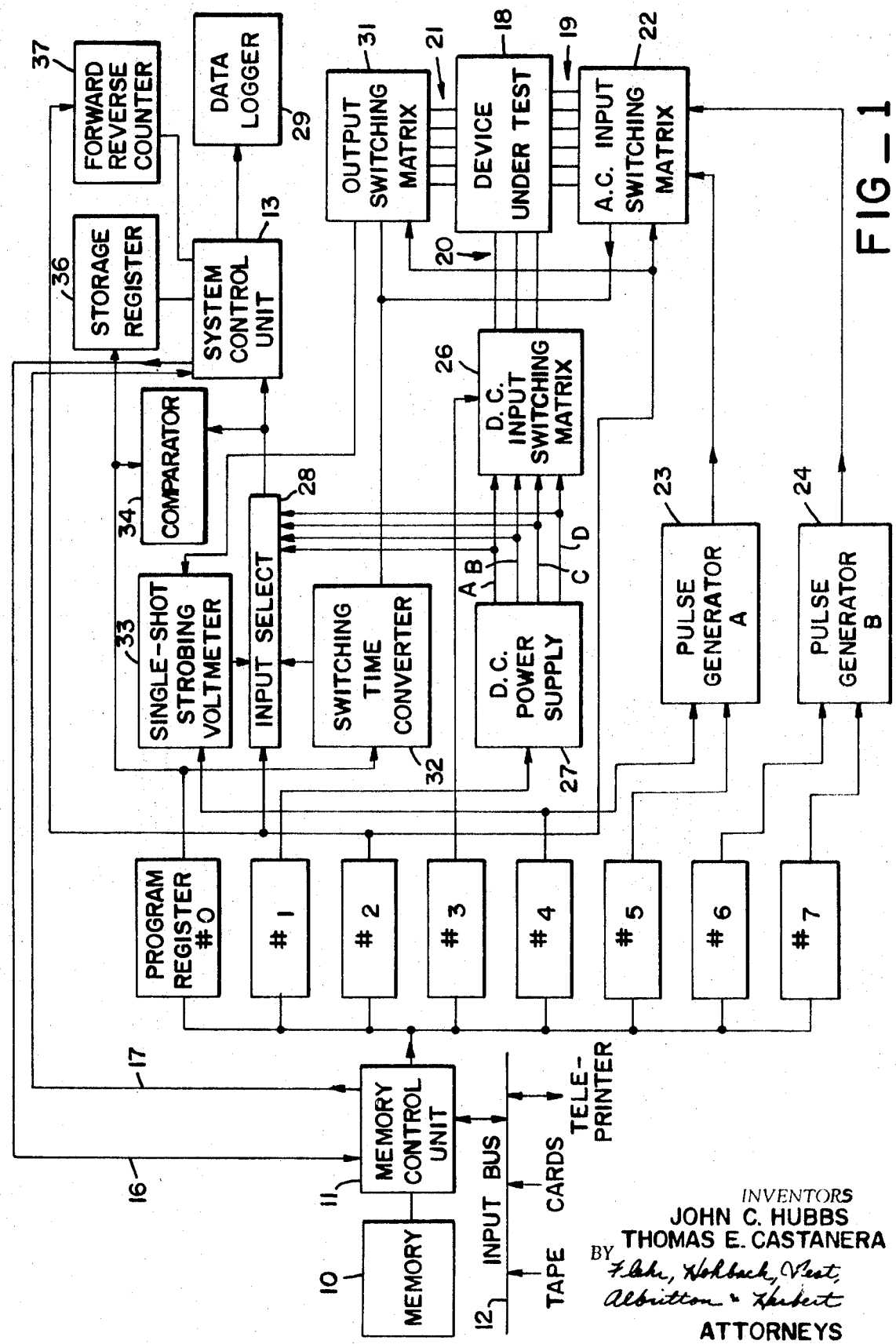
FIG_1

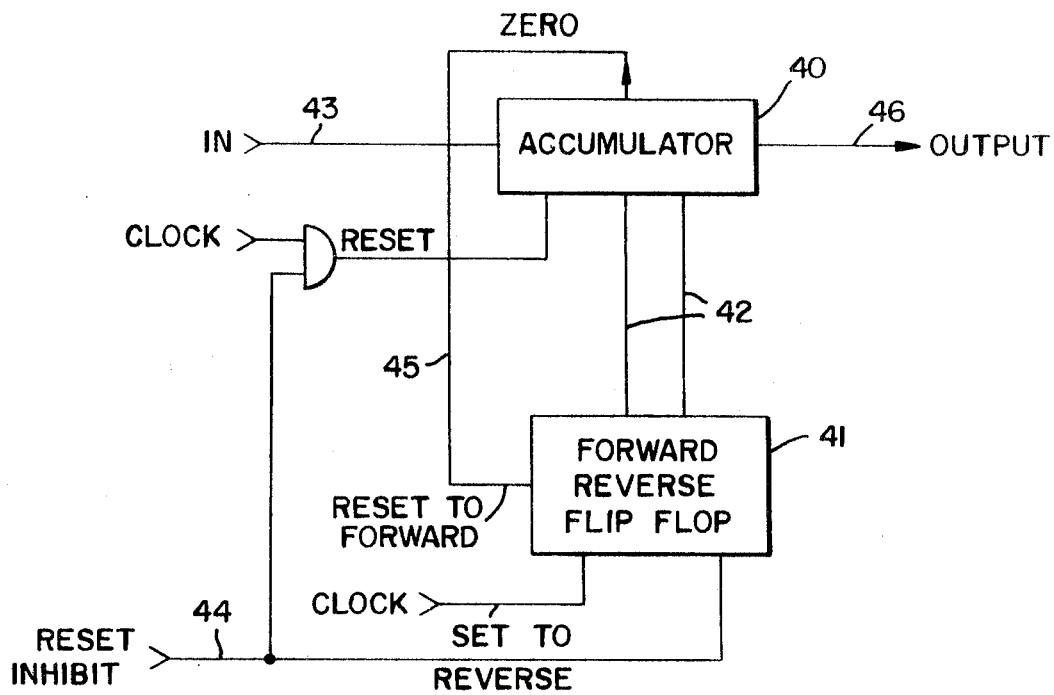
FIG_1A
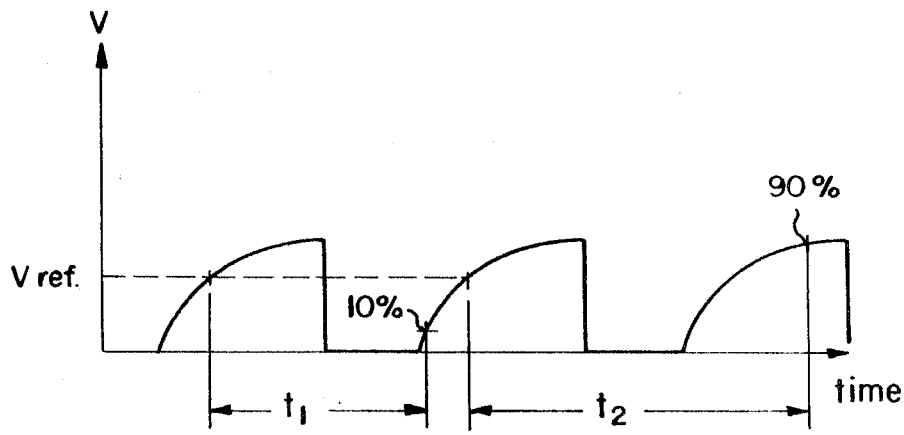
FIG_1B

| CHARACTER | | PROGRAM REGISTER #0 | | | ADDRESS |
|---|---|---|---|---|---|
| 0 | | PROGRAM REGISTER #0 | | | |
| 1 | 800 | 400 | 200 | 100 | HIGH LIMIT |
| 2 | 80 | 40 | 20 | 10 | |
| 3 | 8 | 4 | 2 | 1 | |
| 4 | 800 | 400 | 200 | 100 | LOW LIMIT |
| 5 | 80 | 40 | 20 | 10 | |
| 6 | 8 | 4 | 2 | 1 | |
| 7 | STORE REGISTER | STORE REGISTER | NORM. START | NORM. STOP | NORMALIZING SLOPE & POLARITY |
| 8 | START SLOPE | STOP SLOPE | START POLARITY | STOP POLARITY | |
| 9 | 800 | 400 | 200 | 100 | START THRESHOLD |
| 10 | 80 | 40 | 20 | 10 | |
| 11 | 8 | 4 | 2 | 1 | |
| 12 | 800 | 400 | 200 | 100 | STOP THRESHOLD |
| 13 | 80 | 40 | 20 | 10 | |
| 14 | 8 | 4 | 2 | 1 | |
| 15 | LTF | 1000 N.S. | 100 N.S. | 10 N.S. | RANGE |
| BIT | 8 | 4 | 2 | 1 | |

FIG_2

| CHARACTER | PROGRAM REGISTER #1 | | | | ADDRESS |
|---|---|---|---|---|---|
| 0 | | | | | |
| 1 | 800 | 400 | 200 | 100 | |
| 2 | 80 | 40 | 20 | 10 | A |
| 3 | 8 | 4 | 2 | 1 | |
| 4 | 800 | 400 | 200 | 100 | |
| 5 | 80 | 40 | 20 | 10 | B |
| 6 | 8 | 4 | 2 | 1 | POWER SUPPLY |
| 7 | 800 | 400 | 200 | 100 | |
| 8 | 80 | 40 | 20 | 10 | C |
| 9 | 8 | 4 | 2 | 1 | |
| 10 | 800 | 400 | 200 | 100 | |
| 11 | 80 | 40 | 20 | 10 | D |
| 12 | 8 | 4 | 2 | 1 | |
| 13 | D | C | B | A | RANGE |
| 14 | D | C | B | A | POLARITY |
| 15 | LTF | | | | |
| | 8 | 4 | 2 | 1 | |

BIT

FIG_3

| CHARACTER | PROGRAM REGISTER #2 | | | | ADDRESS |
|---|---|---|---|---|---|
| 0 | | | | | |
| 1 | | 4 | 2 | 1 | |
| 2 | 4 | 2 | 1 | 4 | P/S |
| 3 | 2 | 1 | 4 | 2 | MATRIX |
| 4 | 1 | 4 | 2 | 1 | |
| 5 | | 4 | 2 | 1 | |
| 6 | 8 | 4 | 2 | 1 | |
| 7 | 8 | 4 | 2 | 1 | INPUT & OUTPUT MATRIXES 22 & 31 |
| 8 | | | | | |
| 9 | | | | | |
| 10 | | 4 | 2 | 1 | |
| 11 | 8 | 4 | 2 | 1 | |
| 12 | 8 | 4 | 2 | 1 | |
| 13 | LTI | | | | LAST TEST INDICATOR |
| 14 | 8 | 4 | 2 | 1 | INPUT SELECT |
| 15 | LTF | INPUT POLARITY | RESET INHIBIT | IGNORE | SYSTEM CONTROL |
| BIT | 8 | 4 | 2 | 1 | |

FIG_4

| CHARACTER | Bit 8 | Bit 4 | Bit 2 | Bit 1 | ADDRESS | |
|---|---|---|---|---|---|---|
| 0 | PROGRAM REGISTER # 4 | | | | | |
| 1 | | | | | | |
| 2 | | | | | | |
| 3 | | | | | | |
| 4 | 800 | 400 | 200 | 100 | | |
| 5 | 80 | 40 | 20 | 10 | DELAY | STROBING VOLTMETER 33 |
| 6 | 8 | 4 | 2 | 1 | | |
| 7 | | 100 μs | 10 μs | 1 μs | RANGE | |
| 8 | 800 | 400 | 200 | 100 | | |
| 9 | 80 | 40 | 20 | 10 | OFFSET | |
| 10 | 8 | 4 | 2 | 1 | | |
| 11 | 800 | 400 | 200 | 100 | | PULSE GENERATOR 23 |
| 12 | 80 | 40 | 20 | 10 | AMPLITUDE | |
| 13 | 8 | 4 | 2 | 1 | | |
| 14 | X5 | X4 | X2 | AMPL. POLARITY | ATTN & POLARITY | |
| 15 | LTF | | | OFFSET POLARITY | OFFSET | |

BIT

FIG_5

INVENTORS
JOHN C. HUBBS
THOMAS E. CASTANERA
BY
Flehr, Hohbach, Test,
Albritton & Herbert
ATTORNEYS

PATENTED AUG 3 1971     3,597,682

| CHARACTER | PROGRAM REGISTER # 5 | | | | ADDRESS |
|---|---|---|---|---|---|
| 0 | | | | | |
| 1 | 800 | 400 | 200 | 100 | RISE RAMP |
| 2 | 80 | 40 | 20 | 10 | |
| 3 | 330-13.30 | 100-400 | 33.3-130 | 10-40 | RAMP RANGE NS/V |
| 4 | 3.3-13.3 | 1-4 | 0.5-2 | | |
| 5 | 800 | 400 | 200 | 100 | FALL RAMP |
| 6 | 80 | 40 | 20 | 10 | |
| 7 | 800 | 400 | 200 | 100 | DELAY |
| 8 | 80 | 40 | 20 | 10 | |
| 9 | X 100 | X 10 | X 1 | X 0.1 | DELAY RANGE |
| 10 | 800 | 400 | 200 | 100 | WIDTH |
| 11 | 80 | 40 | 20 | 10 | |
| 12 | X 100 | X 10 | X 1 | X 0.1 | WIDTH RANGE |
| 13 | 800 | 400 | 200 | 100 | FREQUENCY |
| 14 | 80 | 40 | 20 | 10 | |
| 15 | LTF | X 1 KH2 | X 100 H2 | X 10 H2 | FREQUENCY RANGE |
| BIT | 8 | 4 | 2 | 1 | |

PULSE GENERATOR 23

FIG_6

INVENTORS
JOHN C. HUBBS
THOMAS E. CASTANERA
BY *Flehr, Hohbach, Test,*
*Albritton & Herbert*
ATTORNEYS

PROGRAMMABLE TESTING UNIT FOR SINGLE SHOT TESTING

BACKGROUND OF THE INVENTION

The present invention relates in general to a programmable dynamic testing system and more particularly to a system for testing a device having several output and input terminals.

With the advent of complex, large scale integrated circuits it has been impractical to dynamically test such circuits on a production basis. Such testing by ordinary laboratory methods would consume an excessive amount of time. In fact, the number of tests on a large scale array type device is so large that if the testing is done by ordinary computer techniques, the operating time of the computer may be excessive. This is especially true where the testing instrumentation does not have a single-shot capability.

SUMMARY OF THE INVENTION AND OBJECTS

It is therefore a general object of the present invention to provide an improved programmable dynamic testing system;

It is another object of the present invention to provide a system as above which is capable of adequately testing large scale array integrated circuits on a production basis;

It is another object of the present invention to provide a system as above which effectively utilizes a single-shot type testing apparatus; and It is another object of the present invention to provide a programmable testing system which minimizes the time required for programming.

In accordance with the above objects there is provided a programmable testing system for a device having a plurality of inputs and outputs. The system comprises memory means and a plurality of program registers coupled to these memory means. Each program register controls a unique testing function of the system. Selected ones of the registers route outputs to selected test instruments with the selected test instruments being responsive to a single output pulse from the device under test for providing the information. Other registers provide testing pulses for the inputs of the device. Control means load the program registers with testing instructions from the memory for one test sequence. The control means sense when the test sequence is finished and reload only those program registers where the last sequence is to be modified. The control means also sense the completion of the testing of the device under test.

BRIEF DESCRIPTION OF THE DRAWINGS

FIG. 1 is a block diagram of a testing system incorporating the present invention;

FIG. 1A is a detailed block diagram of a portion of FIG. 1;

FIG. 1B shows test waveforms useful in understanding the present invention;

FIGS. 2 through 6 are computer program formats useful in understanding the operation of the present invention.

DETAILED DESCRIPTION OF PREFERRED EMBODIMENT

Referring now to FIG. 1, a core memory 10 stores information in binary form. A memory control unit 11 couples the memory to the remainder of the system. An input 12 coupled to memory control unit 11 interfaces the outside data sources such as tape, cards, and a teleprinter as indicated. The teleprinter may also be used for output data if desired. Memory control unit 11 fills or loads eight designated program registers numbered 0 through 7 from the memory as will be more fully explained below.

The testing system as a whole is controlled by a system control unit 13. This unit is coupled to the memory control unit through lines 16 and 17 to provide both a transmission of data from memory to the system control unit on path 17 and to provide on path 16 for transmission of control signals from the system control unit to the memory control unit.

Unit 13 controls the system as a whole from a timing standpoint. For example, certain settling periods are allowed for the different instruments used in the system, transmission times for the various switches and links in the system and adequate time must be allowed for the logging of any generated data.

The program registers receive instruction data from memory 10 which is retained in the registers which then automatically program associated test instrumentation for a device under test 18. Such a device under test would normally be, for example, a large scale integrated circuit. Such a circuit would have several AC type inputs 19, several DC inputs 20 for biasing voltages and a number of outputs 21.

From an input standpoint test pulses are coupled to inputs 19 through an AC input switching matrix 22. This switching matrix is controlled by program register 2 to which it is coupled. Inputs to the AC switching matrix 22 are provided either by a pulse generator A, designated 23, or a pulse generator B, designated 24. Pulse generators 23 and 24 are of the programmable type for generating high speed single-shot pulses. One suitable generator is manufactured by E-H Laboratories under their designation model 1139 for the programmable pulse driver portion of the generator and model 1420 for a programmable timing unit. The pulse generators 23 and 24 are programmed respectively by program registers 4 and 5 and program registers 6 and 7. The details of such programming will be explained below.

The DC inputs 20 of device under test 18 are supplied various voltages through a DC input switching matrix 26 which is controlled by program register 3. Matrix 26 is coupled to a DC power supply 27 which provides four different DC voltages on lines designated A, B, C, D. The magnitude of these voltages is determined by program register 1 to which DC power supply 27 is coupled. The four DC outputs A—D of power supply 27 are also coupled to the input select switching unit 28 which is controlled by program register 2. Unit 28 selectively couples any desired DC power supply information to system control unit 13 and then to a data logger 29.

From an output standpoint outputs 21 of device 18 are coupled into an output switching matrix 31 controlled by and coupled to program register 2. Matrix 31 selectively couples the test pulse outputs of the device under test 18 to a switching time converter 32 and a single-shot strobing voltmeter 33. Although matrixes 22, 26, and 31 are shown in separate blocks they would normally be in a single unit, preferably having a very low capacitance. Such units are manufactured at present by Automated Measurements Corporation and are termed a coaxial reed-type switching tree. Both converter 32 and voltmeter 33 should have what is termed a single-shot capability. In other words, the ability to analyze a single output test pulse from device 18 without the need of time consuming repetitive measurements.

Switching time converter 32 basically measures the time interval between discrete points on a single waveform. Such a device is manufactured by E-H Laboratories under their model number 142. The single-shot features of this instrument are disclosed and claimed in a copending patent application Ser. No. 690,448, filed Dec. 14, 1967, in the name of Arthur E. Bjerke, entitled TIME TO HEIGHT CONVERTER and now Patent No. 3,544,813. Similarly, single-shot strobing voltmeter 33 detects the amplitude of an output test pulse from device 18 at a predetermined time interval after a reference time. Such a voltmeter is sold by E-H Laboratories under model number 153. The single-shot features of the voltmeter are disclosed and claimed in a copending application in the name of Willis D. Stinson, Jr., Ser. No. 708,578, filed Feb. 27, 1968, entitled SINGLE-SHOT STROBING VOLTMETER and now U.S. Pat. No. 3,528,007.

Voltmeter 33 is coupled to and controlled by program register 4 and converter 32 is coupled to and controlled by program register 0. Both of these devices have outputs coupled to input select unit 28 which selectively couples any information produced from these test units through system control unit 13 to data logger 29.

The output of the input select unit 28 is also inhibit." a comparator unit 34 which has high and low limits programmed into it by program register 0. Comparator 34 operates in conjunction with system control unit 13. The comparator serves the function of accepting or rejecting devices 18 depending upon whether they fall within or without the high and low limits.

Also coupled to system control unit 13 are a storage register 36 and a forward-reverse counter 37. Register 36 is controlled by program register 0 and counter 37 by program register 2. The functions of units 36 and 37 will be explained below.

OPERATION

In operation, after memory 10 is loaded a start indication is given to the system through memory control unit 11 which starts to transfer blocks of instruction data from the memory 10 into the program registers in the sequence from 0 through 7. Each block of data is held in memory 10 in a program format as shown in FIG. 2 which consists of 16 characters designated 0 through 15 with bit weightings of 1, 2, 4, and 8. The address of each program register is placed in the 0 character location of its specific block of data. In the last character 15 there is a designation L.T.F. meaning Last Transferred Field which indicates to memory control unit 11 whether or not to transfer a block of data to the next program register. A "1" bit is used as the L.T.F. indication and is only placed in the last program format. After all program registers have been filled the system control unit is notified by the memory control unit by a L.T.F. indication and system control unit 13 takes over and initiates the functioning of the system. This is essentially a timing operation where initially the system control unit starts a settling period which is approximately 2 or 4 milliseconds in length. This allows all of the programmed devices which include the pulse generator, switching matrixes, switching time converter and single-shot strobing voltmeter to reach their final values. Next, the system control unit causes one of the pulse generators 23 or 24 to emit a pulse of the parameter programmed by program registers 4—6. Such pulse is coupled to the proper input 19 through switching matrix 22 which has been programmed by program register 2. The resultant output pulse on line 21 is switched by matrix 31 either to converter 32 or voltmeter 33 which makes a measurement of the results in accordance with the manner in which these devices are programmed.

The input select device 28 couples the results to system control unit 13 and comparator 34 to give an accept or reject indication and/or to record such information in data logger 29. Naturally, the magnitude information of outputs produced either by voltmeter 33 or converter 32 would have first been digitized by a commercially available voltage controlled oscillator type system. At the end of this test sequence the system control unit 13 notifies the memory control unit 11 to begin the next test sequence.

However, in the next test sequence, assuming only one parameter is changed on a single testing device, perhaps only one to two blocks of data may be transferred to update just some of the program registers. Thus, this memory transfer would occur much more rapidly. Such transfer of data blocks occur until a last transferred field (L.T.F.) indication at which time the next testing sequence begins. From a time standpoint, each character is transferred through the memory control unit to its respective program register in a time interval of approximately 8 microseconds. Thus, to transfer an entire data block requires 128 microseconds. To transfer all eight data blocks to eight program registers requires more than a millisecond. Because of the single-shot characteristics of the testing devices the entire test requires no more than 5 milliseconds. Therefore, the transfer time of the data from memory to the program register is a significant portion of the testing cycle.

In accordance with the invention, transfer time is minimized by reloading only those program registers where the parameters of the last test sequence are to be modified. In practice normally only one to two registers need be modified with the remaining program registers having the proper parameters. After several test sequences have been carried out the last sequence on the particular device 18 is indicated by the programming of an L.T.I., Last Test Indication, in program register 2 to cause the system control unit 13 and memory control unit 11 to be reset to begin the testing sequence on the next device.

As is apparent, each program register 0 through 7 controls a unique testing function. The format of this function is illustrated in the blocks of information coupled into each of the program registers in FIGS. 2 through 9 and will now be discussed in detail.

First, referring to FIG. 2 and program register 0, the character 0, of course, contains the address of program register 0. Characters 1 through 3 are designated "high limit" and determine the high limit of comparator 34. Character 1 is a hundredths decade, character 2 a tens decade, and character 3 a units decade. By programming the proper bits any number from 1 through 999, may be provided. Similarly, characters 4, 5 and 6 provide a "low limit." These limits may reflect either the switching time outputs of converter 32, the voltage outputs of strobing voltmeter 33, or the voltage outputs, A—D, of DC power supply 27, all of which are coupled to comparator 34 through input select unit 28. Characters 9 through 11 relate to the start threshold voltage level of switching time converter 32, and characters 12 through 14 the stop threshold level of converter 32. These are the two magnitude levels to which the converter can be programmed for which the time interval is measured.

Character 7 provides a means of normalizing the threshold levels. Bit weights 4 and 8 in character 7 labeled "storage register" control storage register 36. Normalize start and stop indications in bit weights 1 and 2 cause the system control unit 13 to control switching time converter 32 to convert the start and stop thresholds to percentages determined by those values stored in storage register 36. More specifically, generally start and stop threshold levels of converter 32 will be a voltage magnitude. Normalization implies that these threshold levels are percentages of a predetermined high and low voltage range. This voltage range is provided by previous measurements made by the strobing voltmeter 33 and stored in storage register 36. When the storage register 36 is programmed by program register 2 to accomplish this function at least two magnitude measurements of a first test pulse will be made by strobing voltmeter 33 at two different points in time, stored in register 36, and then during a second testing sequence this stored information will be utilized to obtain start and stop thresholds which are percentages of the difference between the high and low voltages stored by storage register 36. In normal operation these high and low voltages would represent the 0 percent and 100 percent reference points of the test waveform. The programming of the normalize start and stop bits, 1, 2 in character 7 cause the switching time converter to recognize the program start and stop threshold information in characters 9 through 14 as percentage values rather than as absolute voltage magnitudes. Thus, for example from an absolute magnitude point of view the start threshold might be programmed as 1.09 volts, or with normalization this value would be 10.9 percent of the difference between the high and low magnitudes in the storage register 36. Thus, by normalization the random variations in the output magnitude of the test pulse from the device are eliminated providing a more accurate measurement.

Referring now to the other characters of program register 0, a character 8 determines the slope and polarity programming of the switching time converter 32. Specifically, in bit weight 8 a "1" character here causes the start slope in the converter to be programmed for triggering on a positive slope. When not selected the trigger always triggers on a negative slope. With bit weight 4 a "1" character causes a stop discriminator of the converter to trigger on a positive slope when selected; when not selected the stop discriminator will always trigger on a negative slope. With a "1" indication in bit weight 2 the start discriminator always has a threshold on a positive polarity; when not selected it will trip on a negative polarity. The same relationships are true with "stop polarity" in bit weight 1. Character 15 contains in bit weight 8 the last transferred field bit.

Bit weights 4, 2 and 1 in character 15 contain the selection of measurement ranges from 1,000 nanoseconds, 100 nanoseconds, and 10 nanoseconds, respectively, for the switching time converter. This measurement range is in essence the time between the two different threshold points. A 1 nanosecond full scale measurement range is selected by not programming any of the bits 1, 2 or 4.

With respect to program register number 1, as shown in FIG. 3, character 0 contains the address for program register 1. The four power supplies included in DC power supply 27 are controlled by characters 1—12, labeled A, B, C, and D. The amount of output voltage in each power supply may be programmed as indicated. In character 13 a bit in any one of these locations will cause 10 volts to be added to the programmed value of the power supply in characters 1—12. Character 14 selects the polarity of these four power supplies and in character 15 there is a last transferred field (L.T.F.) indication if necessary.

FIG. 4 illustrates the program format for register 2. This program register, as mentioned before, controls the switching matrixes 22, 26, 31 and input select unit 28 (FIG. 1). Characters 1 through 4 control the switching of DC Characters 5 through 12 control both AC input switching matrix 22 and output switching matrix 31. Note that several permutations are necessary since the switching time converter 32 would in many instances have its start discriminator coupled to the input switching matrix 22. Specifically, characters 5, 6 and 7 control the pulse generators 23 and 24 with characters 8 and 9 being vacant; characters 10 and 12 control coupling to switching time converter 32 with character 11 switching the outputs of device 18 to strobing voltmeter 33. Character 13 contains in bit weight 8 the last test indication (L.T.I.) which indicates, when programmed, a last sequence of tests for that particular device is finished and another device may now be tested. The system control unit 13 is responsive to this indication. Character 14 contains the "input select proram" and in essence controls input select unit 28. Although it has the capability of selecting 16 different inputs through the system control unit in comparator 34 it utilizes six; namely, inputs from the switching time converter 32, single-shot strobing voltmeter 33, and the four power supplies A—D from power supply unit 27. These are arbitrarily assigned an input select code.

Character 15 includes in bit weight 8 a last transferred field (L.T.F.) indication. In bit location 4 is an "input polarity" bit which, when selected, will cause the system to measure positive voltages only; when not selected it measures negative voltages.

Bit location 2 in character 15 is designated "reset inhibit." This is used when a differential type measurement is desired.

The purpose of a differential measurement is to eliminate the effects of random voltage variations in, for example, the measurement of rise time of an output test pulse which is normally from the 10 percent point to the 90 percent point of the waveform. In the differential measurement procedure of the present invention the measurement is conducted over three test sequences as illustrated in FIG. 1B. In one test sequence the switching time converter 32 is programmed to measure the time interval, $t_1$, from a convenient intermediate reference voltage, $V_{ref}$, taken on a first test pulse to the 10 percent point of the next output test pulse. The forward-reverse counter 37 (FIG. 1) counts forward or up until the 10 percent point is reached on the next test waveform at which time it stops counting. The "reset inhibit" then causes the counter to count down or in reverse when it is started on the subsequent pulse at $V_{ref}$. The count down continues until the 90 percent point on the third output test pulse is reached. This time interval is indicated as $t_2$. In the meantime, of course, the counter has counted down to zero and again started to count up. Thus, the accumulated count in counter 37 will be the rise time of the test pulses measured between the 10 percent and 90 percent points. The reference voltage $V_{ref}$ will have been cancelled out; thus, the measurement is more accurate. It is apparent from inspection of FIG. 1B that the counter has actually taken the difference between $t_1$ and $t_2$, and that subtraction of $t_1$ and $t_2$ produces the 10 percent to 90 percent time interval representing rise time.

FIG. 1A shows the detailed block diagram of counter 37 which includes an accumulator 40 coupled to a flip-flop 41 by two lines 42. Lines 42 determine whether accumulator 40 counts in a forward or reverse mode. A digitized input voltage representing the test pulses is provided on line 43. The "reset inhibit" indication from program register 2 is on line 44. Line 45, labeled "zero" indicates when the accumulator has reached zero thus causing the accumulator to be reset to its forward mode. The remaining inputs are clocking inputs. The output of accumulator 40 is on line 46 which is coupled into system control counter 13 and then to data logger 29.

Now again referring to FIG. 4, bit weight 1 in character 15 labeled "ignore measurement" will, when selected, cause the results of that measurement not to be data logged in the data logger 29 and to be ignored by the limits comparator 34. This may be utilized for wasting time in the system to allow for additional settling time on the units which are slow settling such as power supplies. Normally, "ignore measurement" will allow 5 milliseconds additional settling to be provided for the system since this is the time for a normal testing sequence.

Program register 3 merely controls the DC switching matrix 26 and thus its program format will not be shown since it is a simple matrix control. It, of course, includes the last transferred field (L.T.F.) bit in its character 15.

The program format for register 4 is shown in FIG. 5 and includes in character 0 an address with characters 1 through 3 unassigned. Characters 4 through 6 are assigned to strobing voltmeter 33 to control the amount of time delay between a reference point and the actual voltmeter measurement. Character 7 contains the time delay ranges for strobing voltmeter 33 and labeled 100, 10, and 1 microseconds. If none of the bits in character 7 are selected there is a 100 nanosecond/volt scale delay range.

Character locations 8 through 15 relate to the pulse generator 23. Locations 8, 9, and 10 provide for offset voltages, character 14 controls the attenuation of the pulse generator. In bit location 1 of character 14 the "amplitude polarity," when selected, causes the pulse amplitude to be positive and when not selected to be negative. In character 15 the last transferred field (L.T.F.) bit is in bit weight 8 and in the location 1 a positive offset polarity is programmed when this is selected.

FIG. 6 shows the program format for program register 5 which relates entirely to the remaining programming requirements of pulse generator 23. Character 0 contains the program address. Characters 1 through 6 control the rise and fall ramps of the pulse generator. Characters 7 and 8 determine the time delay from a reference time at which pulses are to be generated. Character 9 determines the delay range as indicated. Characters 10 and 11 determine the width of the pulse and character 12 the width range. Characters 13 and 14 along with character 15 determine the frequency of the test pulses generated and the frequency range.

Program register 6 is programmed identically to program register 4 except that no information is needed for a strobing voltmeter. Similarly, program register 7 is programmed identically to program register 5.

Thus, in summary the present invention provides an improved dynamic pulse testing system where the system is capable of testing large scale array integrated circuits on a production basis. This is made possible by the single-shot capability of the strobing voltmeter 23 and switching time converter 32 along with the necessity to update only those program registers where the parameters are being changed. Since this updating consumes a significant percentage of time as compared to the overall system test sequence, efficient system updating allows for effective testing. It also allows the single-shot capability of the voltmeter 23 and converter 32 to be effectively utilized since the remainder of the system operates with time magnitudes comparable to that of the single-shot instruments.

We claim:

1. A programmable testing system for a device under test having a plurality of inputs and outputs, comprising: memory means for storing testing instructions, pulse generating means for providing testing pulses, a plurality of test instruments responsive to a single output pulse from said device for providing test information, a plurality of program registers coupled to said memory means for controlling a plurality of functions in accordance with said testing instructions, said functions including selected registers routing outputs of said device to said test instruments, and including other selected registers for routing testing pulses from said pulse generating means to the inputs of said device to cause outputs of said device to provide said output pulses, and control means for loading said registers with said testing instructions from said memory for one test sequence, for sensing when said test sequence is finished and updating only those program registers where the last test sequence is to be modified and for sensing the completion of the testing on said device.

2. A testing system as in claim 1 where one of said selected instruments is a switching time converter for measuring the time interval between two discrete points on a single output pulse from said device under test, the first point in time being determined by a start voltage threshold level and the second point by a stop voltage threshold level, another of said selected instruments being a strobing voltmeter for detecting the amplitude of an output pulse from said device under test at a predetermined time interval after a reference time, together with normalizing means including storage register means responsive to at least two magnitude measurements of an output pulse at two different points in time for storing said magnitudes, said switching time converter being responsive to a normalization indication of one of said program registers along with start and stop threshold information contained in such program register to recognize such start and stop threshold information as percentage values with reference to said two stored magnitude measurements.

3. A testing system as in claim 1 where one of said selected instruments is a switching time converter for measuring the time interval between two discrete points on a single output pulse from said device under test, the first point in time being determined by a start voltage threshold level and the second point by a stop voltage threshold level, together with differential measuring means including a forward-reverse counter said switching time converter being responsive to programmed directions from a program register for measuring a time interval, $t_1$, from a predetermined reference voltage of an output pulse from said device under test to a predetermined low voltage point, relative to said reference voltage, of the next output pulse in time, said counter counting in a forward mode during all of said time interval, $t_1$, said switching time converter also being responsive to said programmed directions for measuring a time interval, $t_2$, between said reference voltage point on such next output pulse and a predetermined high voltage point, relative to said reference voltage, on the next subsequent output pulse, said counter being responsive to an indication in a program register for counting in a reverse mode from the start of said $t_2$ time interval to zero count, said counter thereafter being conditioned to count forward until the end of $t_2$, whereby the count contained in said counter is a measure of the time interval between said low and high voltage points.